US012791150B2

(12) United States Patent
Criel et al.

(10) Patent No.: US 12,791,150 B2
(45) Date of Patent: Nov. 10, 2026

(54) TANK FOR CONTAINING A PRESSURIZED GAS

(71) Applicant: PLASTIC OMNIUM NEW ENERGIES FRANCE, Lyons (FR)

(72) Inventors: Bjorn Criel, Brussels (BE); Mathieu Jongbloedt, Brussels (BE); Richard Apaloo, Brussels (BE); Alejandro Soriano-Sutil, Brussels (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 0 days.

(21) Appl. No.: 19/109,003

(22) PCT Filed: Aug. 10, 2023

(86) PCT No.: PCT/EP2023/072236
§ 371 (c)(1),
(2) Date: Mar. 5, 2025

(87) PCT Pub. No.: WO2024/052046
PCT Pub. Date: Mar. 14, 2024

(65) Prior Publication Data

US 2025/0377075 A1 Dec. 11, 2025

(30) Foreign Application Priority Data

Sep. 6, 2022 (FR) ....................................... 2208886

(51) Int. Cl.
*F17C 1/16* (2006.01)
*F17C 1/06* (2006.01)

(52) U.S. Cl.
CPC .................. *F17C 1/16* (2013.01); *F17C 1/06* (2013.01); *F17C 2203/0604* (2013.01); *F17C 2203/066* (2013.01)

(58) Field of Classification Search
CPC ...... F17C 1/16; F17C 1/06; F17C 1/04; F17C 1/02; F17C 2203/0604; F17C 2203/0602; F17C 2203/066
(Continued)

(56) References Cited

U.S. PATENT DOCUMENTS

| | | | | |
|---|---|---|---|---|
| 5,429,845 A * | 7/1995 | Newhouse | F17C 1/16 220/582 |
| 6,089,399 A * | 7/2000 | Felbaum | B32B 15/013 220/582 |

(Continued)

FOREIGN PATENT DOCUMENTS

| | | | |
|---|---|---|---|
| DE | 19751411 C1 * | 1/1999 | F17C 1/16 |
| DE | 10 2014 207 069 A1 | 10/2015 | |

(Continued)

OTHER PUBLICATIONS

International Search Report issued Nov. 7, 2023 in PCT/EP2023/072236, filed on Aug. 10, 2023, 2 pages.

*Primary Examiner* — Robert J Hicks
(74) *Attorney, Agent, or Firm* — Oblon, McClelland, Maier & Neustadt, L.L.P.

(57) ABSTRACT

A tank for containing a pressurized gas includes a liner made of plastic material and having the general shape of a cylinder with a main axis. The liner includes a neck surrounding an axial opening of the liner; an end-piece at least partially formed in the neck of the liner; a reinforcement ring provided for reinforcing the neck of the liner and being rigidly connected to and non-detachable from the neck of the liner; and a fastening device for fastening the end-piece to the ring for reinforcing the neck of the liner.

21 Claims, 7 Drawing Sheets

(58) Field of Classification Search
USPC .................... 220/589, 582, 592, 586, 560.04
See application file for complete search history.

(56) References Cited

U.S. PATENT DOCUMENTS

| | | | | |
|---|---|---|---|---|
| 2007/0012551 | A1* | 1/2007 | Rohwer .................. | F17C 13/04 200/61.22 |
| 2011/0101002 | A1* | 5/2011 | Strack ....................... | F17C 1/00 220/729 |
| 2011/0220661 | A1 | 9/2011 | Strack | |
| 2012/0205337 | A1 | 8/2012 | Holbach et al. | |
| 2015/0292679 | A1 | 10/2015 | Ehgartner | |
| 2016/0123538 | A1* | 5/2016 | Nakamura ............. | F17C 13/06 220/582 |
| 2021/0123565 | A1 | 4/2021 | Kerforn et al. | |
| 2022/0034452 | A1 | 2/2022 | Wahl et al. | |

FOREIGN PATENT DOCUMENTS

| | | | | |
|---|---|---|---|---|
| EP | 0 810 081 | A1 | 12/1997 | |
| FR | 1 431 135 | A | 3/1966 | |
| FR | 3 089 160 | A1 | 6/2020 | |
| WO | WO-2010096517 | A1 * | 8/2010 | ............ F17C 13/002 |
| WO | WO 2011/047752 | A1 | 4/2011 | |
| WO | WO 2022/136045 | A1 | 6/2022 | |

* cited by examiner

Fig. 1
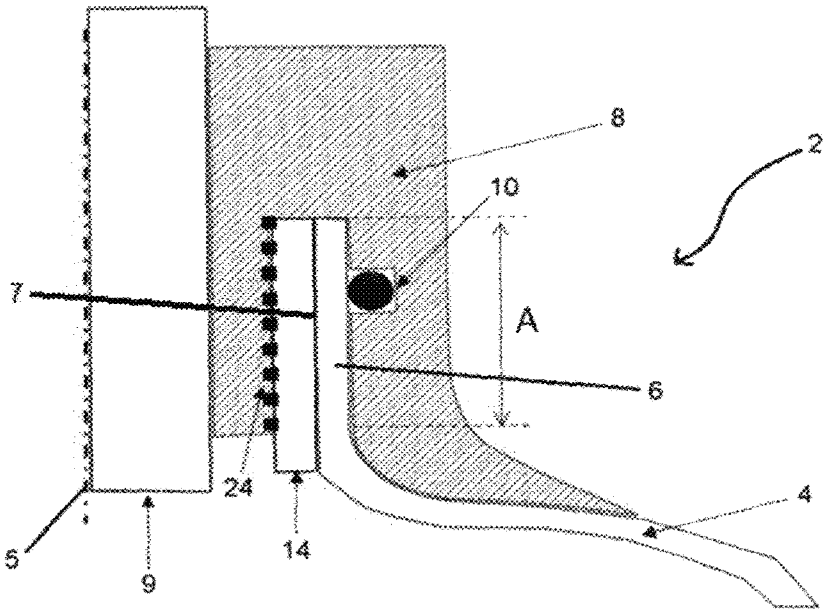
Fig. 2
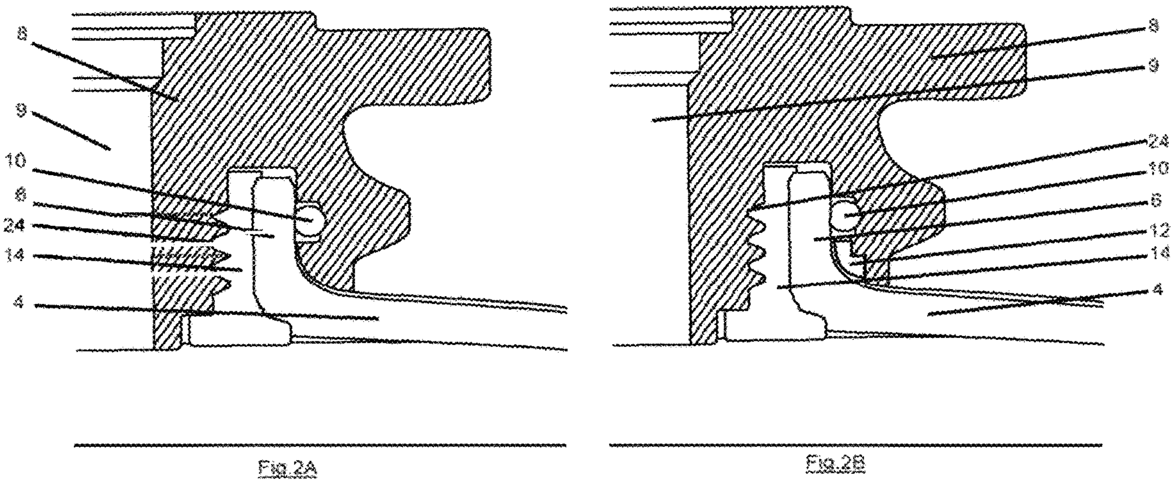
Fig.2A
Fig.2B
Fig. 3
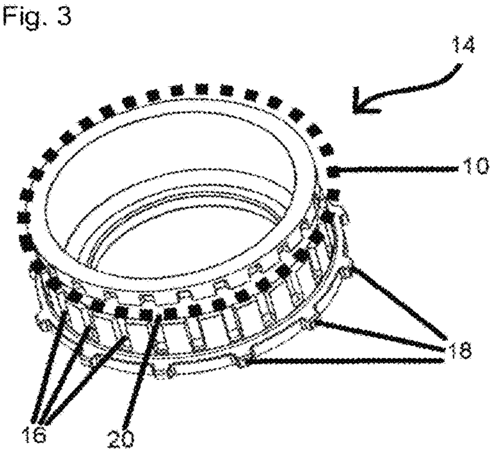

Fig. 4
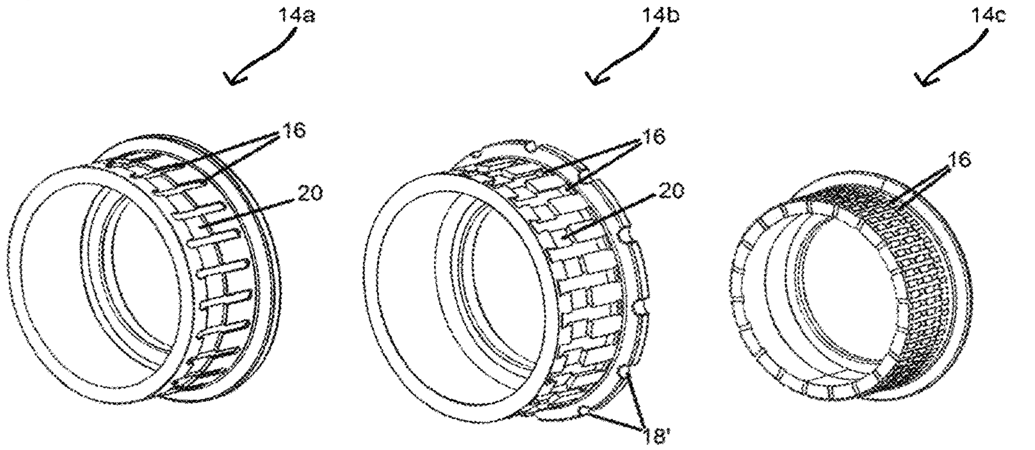
Fig.4A Fig.4B Fig.4C
Fig. 5
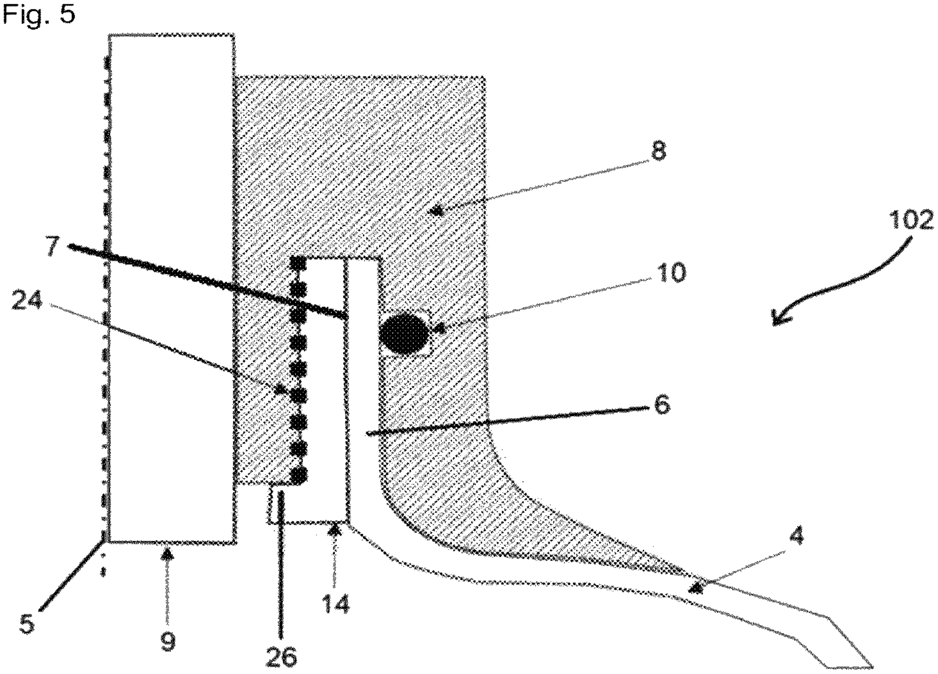

Fig. 10
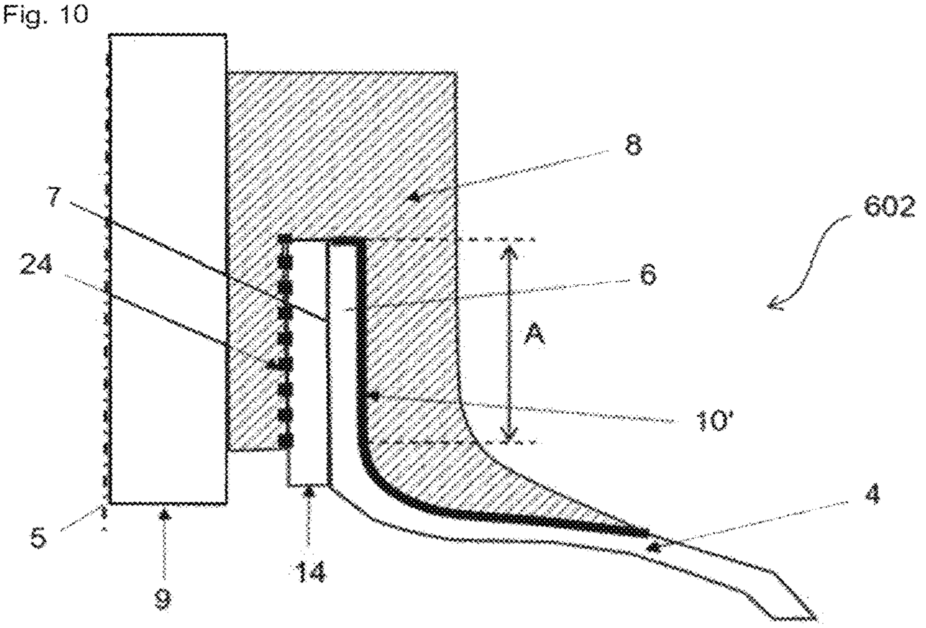
Fig. 11
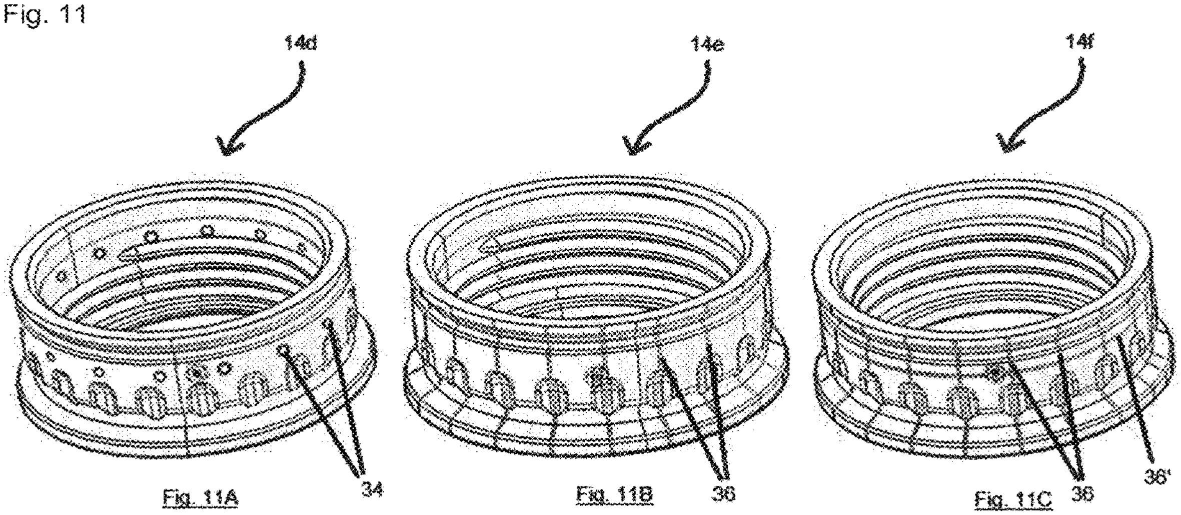
Fig. 11A Fig. 11B Fig. 11C

TANK FOR CONTAINING A PRESSURIZED GAS

The invention relates to tanks for containing pressurized gases, especially tanks installed on-board motor vehicles. The invention relates more specifically to a tank for containing a pressurized gas and to a process for manufacturing a tank for containing a pressurized gas. These gases include, but are not limited to, natural gas, biogas, liquefied petroleum gas, and hydrogen.

The various functions of these tanks are to:

- contain the pressurized gas, i.e. resist mechanically,
- ensure tightness to the outside,
- fill with pressurized gas, using an electrically operated valve mounted on the end-piece,
- deliver pressurized gas using the same electrically operated valve mounted on the end-piece,
- fasten to the supporting structure,
- withstand conditions of transport and use,
- withstand external mechanical and thermal stresses from the environment,
- withstand tank manufacturing conditions.

These tanks can be mounted on all types of fixed or mobile equipment (road, rail, sea, air, or space vehicles). The pressurized gas tanks are made of metal or, more recently, composite materials, for reasons of weight savings and safety.

Tanks made of composite materials, also referred to as composite tanks, are generally sealed by means of a vessel referred to as a "liner", capable of sealing the container against the contents. Depending on the tank manufacturer, liners made of metal materials or plastic materials are provided.

The "plastic" liner comprises at least one opening for filling and emptying the tank. It is manufactured by injection or by rotational molding or by extrusion-blow molding of a thermoplastic or thermosetting polymer (abbreviated to "thermoset") such as for example polyethylene, polyamide, polyphthalamide, polyurethane, silicone, and polyoxymethylene. Advantageously, the thermoplastic polymer material is filled with reinforcing fibers to form a composite material. The reinforcing fibers are, for example, glass fibers, carbon fibers, basalt fibers, aramid fibers, polymer fibers, silica fibers, polyethylene fibers, natural fibers, metal fibers, metal alloy fibers, or ceramic fibers. These fibers make it possible to increase the resistance to deformation of the composite material. In a polymer material filled with reinforcing fibers, the reinforcing fibers and the polymer material are entangled to form a single-piece material. Such a composite material is described by the Applicant in their French patent application No. 18 72197 filed on Nov. 30, 2018 and published under No. 3 089 160.

Alternatively, the liner is manufactured by filament winding. An example of manufacturing a vessel by filament winding is described in patent document FR1431135A.

This liner is then covered by a liner-reinforcement envelope made of composite material that forms the body of the tank, i.e. the resistant structure of the tank, which must be capable of withstanding the pressures exerted by the fluid contained in the tank (hereinafter referred to as "internal pressure"). The reinforcement envelope is generally not required to seal the tank.

This reinforcement envelope consists of:

- a reinforcement generally consisting of fibers, e.g. continuous fibers, glass fibers, carbon fibers, basalt fibers, or others such as silica fibers or even plant fibers,

- a resin which is either deposited at the same time as the fiber (filament winding process) or after the envelope has been produced to form a dry "preform". This dry preform is then consolidated to give it the necessary rigidity. This consolidation is achieved by injecting a resin, or by infiltrating a resin through the preform (infusion process), or else by impregnating a resin under vacuum.

Advantageously, the reinforcement envelope is coated with one or more layers of a fire-retardant material, preferably an intumescent fire-retardant material such as, for example, a silicate- or phosphate-based coating. Silicate and phosphate are intumescent agents which, after exposure to fire, expand and create an insulating barrier. This improves the resistance to heat and fire of the tank.

In every case, when the tank is manufactured, an end-piece is sealingly assembled to the liner to enable the filling and the delivery of the fluid. This end-piece is generally made of metal (steel or aluminum). It is fastened to a neck for filling/emptying the liner and has a flange for bearing against the liner. The end-piece also has a tapping for mounting an electrically operated valve on the end-piece. Such an end-piece is described in patent document U.S. Pat. No. 6,230,922. Document US 2011/220661 A1 also discloses a tank comprising such an end-piece.

When the reinforcement envelope is deposited on the liner using a filament winding process, the liner is held in place by a robot arm or a similar device at the end-piece. This can cause problems during the filament winding process. The filament winding process consists in applying consecutive layers of helically and circumferentially wound fibers to the liner. If filament winding is carried out at high speed, a high torque is applied by the robot arm to the end-piece and to the connection between the end-piece and the liner, especially during acceleration or deceleration phases that occur when applying layers of fibers wound along a helical path. With a liner made of polyamide 6 (PA6), a conventional screwing connection between the end-piece and the liner generally provides resistance to a maximum torque of between 200 and 400 Nm; this resistance is lower with a liner made of high-density polyethylene (HDPE). To accelerate the tank manufacturing speed, it is necessary to increase the torque resistance of the connection between the end-piece and the liner.

In order to increase this resistance, it is known to increase the axial span of the neck of the liner connected to the end-piece, in order to increase the connection surface between the end-piece and the neck of the liner. However, this results in an increase in the non-useful volume of the tank, i.e. it increases the overall dimensions of the tank without increasing its capacity to store pressurized gas, at the neck of the liner, which should be avoided given the limited space available in the vehicle. To avoid increasing the non-useful volume of the tank, it is known to change the shape of the liner so that the neck of the liner is offset axially toward the inside of the internal volume of the tank. It is also known to change the shape of the liner so that the neck of the liner extends toward the inside of the internal volume of the tank and not toward the outside of the internal volume of the tank.

In both cases, the axial dimensions of the tank are reduced, thus reducing the overall dimensions of the tank. However, this comes with a drawback, in that it generates a concave zone inside the tank around the base of the neck, generally referred to as "dead volume". The presence of this concave zone considerably complicates the process of measuring the mechanical strength of the tank, carried out in accordance with United Nations Economic Commission for Europe (UNECE) Regulation No. 134 on uniform provisions concerning the approval of motor vehicles and their components with regard to the safety-related performance of hydrogen-fueled vehicles, according to which pressurized fluid is injected into the tank and the deformation of the tank is measured. Once this process has been implemented, the tank must be completely emptied of the fluid used. The emptying of the concave zone, which is difficult to access, is a particularly complex and time-consuming step, so it is preferable to avoid the presence of the concave zone, or at least to reduce the volume of the concave zone as much as possible. However, an increase in the axial span of the neck of the liner connected to the end-piece leads to an increase in the volume of the concave zone.

Another solution for increasing the strength consists in introducing glue between the end-piece and the liner, but this is a time-consuming operation that slows down the tank manufacturing process and is difficult to control.

One aim of the invention is to increase the torque resistance of the connection between the end-piece and the liner. Optimally, this increase in the torque resistance of the connection between the end-piece and the liner is achieved without increasing the overall dimensions of the tank or slowing down the tank manufacturing process.

For this purpose, the invention relates to a tank for containing a pressurized gas comprising a liner made of plastic having the general shape of a cylinder with a main axis, the liner comprising a neck surrounding an axial opening of the liner, the tank comprising:

an end-piece at least partially formed in and around the neck of the liner, a reinforcement ring for reinforcing the neck of the liner and being rigidly connected to and non-detachable from the neck of the liner, and fastening means, optionally removable, for fastening the end-piece to the reinforcement ring for reinforcing the neck of the liner, so that the end-piece is in direct contact with the reinforcement ring and the neck of the liner.

The phrase "a reinforcement ring for reinforcing the neck of the liner and being rigidly connected to and non-detachable from the neck of the liner" means that the reinforcement ring for reinforcing the neck of the liner is rigidly and permanently coupled to the neck of the liner.

In this way, the presence of the reinforcement ring being rigidly connected to and non-detachable from the neck of the liner strengthens the mechanical connection between the end-piece and the neck of the liner, thereby increasing the torque resistance of this connection, which can exceed 500 Nm. In particular, the arrangement of the neck of the liner, the end-piece, and the reinforcement ring creates a stack comprising, starting from the main axis of the tank and moving radially away from it in an orderly fashion: the end-piece, the reinforcement ring, the neck of the liner, and then the end-piece again. This stack creates a particularly strong, compact mechanical connection between the end-piece and the neck of the liner. This makes it possible to implement a fast filament winding process involving significant acceleration and deceleration phases, and thus to reduce the time and cost of manufacturing the tank. In addition, the presence of the means for fastening the end-piece to the reinforcement ring for reinforcing the neck of the liner means that the various elements are fastened within the axial span of the neck of the liner and not outside of same. In other words, the presence of the reinforcement ring for reinforcing the liner and the fastening of the end-piece to the reinforcement ring for reinforcing the neck of the liner do not increase the axial overall dimensions of the tank. As a result, the non-useful volume of the tank is not increased when the neck of the liner is oriented toward the outside of the internal volume of the tank, and the dead volume of the tank is not increased when the neck of the liner is axially offset, and oriented, toward the inside of the internal volume of the tank.

According to one embodiment of the invention, the neck of the liner extends toward the outside of an internal volume of the tank, and the reinforcement ring is at least partially formed in the neck of the liner, and the fastening means are located radially with respect to the neck of the liner, inside the neck of the liner, so that the reinforcement ring is positioned between the neck of the liner and the end-piece, and the neck of the liner is positioned between the reinforcement ring and the end-piece.

According to an alternative embodiment of the invention, a tank for containing a pressurized gas is provided, comprising a plastic liner having the general shape of a cylinder with a main axis, the liner comprising a neck surrounding an axial opening of the liner and extending toward the inside of an internal volume of the tank, the tank comprising:

an end-piece at least partially formed in the neck of the liner, a reinforcement ring for reinforcing the neck of the liner and being rigidly connected to and non-detachable from the neck of the liner, and fastening means for fastening the end-piece to the reinforcement ring for reinforcing the neck of the liner.

Preferably, the reinforcement ring is at least partially formed around the neck of the liner, and the fastening means form an axial extension of the neck of the liner, extend radially with respect to the neck of the liner, toward the internal volume of the tank, and inside the neck of the liner, so that the neck of the liner is positioned between the reinforcement ring and the end-piece.

Preferably, the reinforcement ring is at least partially formed around the neck of the liner, and the fastening means form an axial extension of the neck of the liner, extend radially with respect to the neck of the liner, toward the internal volume of the tank, and inside the neck of the liner, so that the neck of the liner is positioned between the reinforcement ring and the end-piece.

The invention can thus be implemented in several possible configurations for the liner, which contributes to making the invention easy to implement industrially.

In one preferred embodiment of the invention, the neck of the liner is overmolded onto the reinforcement ring. If the neck of the liner is oriented toward the outside of the internal volume of the tank, the reinforcement ring is overmolded inside the neck of the liner from the outside. If the neck of the liner is oriented toward the inside of the internal volume the tank, the reinforcement ring is overmolded around the neck of the liner from the inside.

The reinforcement ring is thus rigidly connected to and non-detachable from the neck of the liner in an easy and effective manner.

Advantageously, the reinforcement ring is made of a material having a breaking strain or a yield strength which is at least twice that of the material of which the liner is made.

This ensures that the reinforcement ring considerably increases the mechanical strength of the neck of the liner.

Preferably, the reinforcement ring is made of metal, such as aluminum or stainless steel, thermoplastic material or thermosetting material.

The reinforcement ring is thus made of relatively inexpensive and readily available materials.

Advantageously, the fastening means are configured to mechanically anchor the end-piece to the reinforcement ring, for example by screwing or snap-fastening.

This is a simple and inexpensive way of ensuring that the mechanical connection between the end-piece and the reinforcement ring is secure.

Advantageously, the reinforcement ring comprises a shoulder for cooperating with the end-piece configured to receive an axial end of the end-piece.

The reinforcement ring thus forms an axial abutment that facilitates the positioning of the end-piece with respect to the reinforcement ring, and thus ensures a good fit between these two elements, using simple means that do not require an additional part specifically dedicated to this function.

Advantageously, the neck of the liner comprises a shoulder for cooperating with the end-piece configured to receive an axial end of the end-piece.

The neck of the liner thus forms an axial abutment to ensure correct positioning of the end-piece with respect to the neck of the liner, using simple means that do not require an additional part specifically dedicated to this function.

Advantageously, the reinforcement ring comprises a shoulder for cooperating with the liner configured to receive a complementary shoulder formed on the liner, at the base of the neck.

This improves the mechanical anchoring of the reinforcement ring in the neck of the liner, using simple means that do not require an additional part specifically dedicated to this function. This improvement in the mechanical anchoring of the reinforcement ring in the neck of the liner increases the torque resistance of the connection between the end-piece and the liner, which in turn accelerates the filament winding speed and hence the tank manufacturing speed.

Advantageously, the end-piece comprises an annular seal that bears sealingly against the neck of the liner, the annular seal being housed in a cavity of the end-piece. This ensures the correct seal of the connection between the end-piece and the neck of the liner.

Preferably, the cavity of the end-piece is closed by a ring in order to form a groove for housing the annular seal. Preferably, the ring is a removable ring. The ring facilitates the installation of the annular seal between the end-piece and the neck of the liner.

Preferably, the annular seal is a radial seal surrounding the neck of the liner or surrounded by the neck of the liner.

In this way, the annular seal can be easily integrated into the tank, regardless of the embodiment. In addition, a radial seal is preferred to an axial seal, which for example would be formed at an axial end of the neck of the liner, as the radial seal provides the tank with a "self-sealing" configuration. This configuration, also referred to as a "self-sealing arrangement", is such that increasing the pressure inside the tank leads to an increase in the compression of the annular seal, thus improving sealing. This is not the case in the presence of axial seals.

Preferably, the tank includes a first communication means configured to place an internal volume of the tank in fluid communication with a first cavity extending between the end-piece and the axial ends of the reinforcement ring and the neck of the liner.

Preferably, the tank includes a second communication means configured to place the first cavity in fluid communication with a second cavity, or cavity of the end-piece, into which the annular seal extends.

"Fluid communication" is used herein to mean that the pressurized gas contained in the tank can flow freely between the internal volume, the first cavity, and the second cavity via the communication means, so that the gas pressure balances between the internal volume, the first cavity, and the second cavity.

When filling or emptying the tank, the first and second cavities can exhibit a pressure difference with the internal volume of the tank. This is especially critical when the tank is emptied, since the pressure inside the first and second cavities can remain higher than the pressure inside the internal volume even after emptying is complete. This pressure increases the risks of pressurized gas leaking from the tank. This is particularly noticeable when the pressure in the internal volume drops below 50 bar and at low temperatures, and is amplified when the tank is emptied at high flow rates. The communication means enable the pressure in the first and second cavities to be balanced with the pressure in the internal volume of the tank, thus remedying the above-mentioned problems.

Advantageously, the tank also comprises a sealed contact surface between the end-piece and the neck of the liner. For example, the neck of the liner and the end-piece each have a smooth surface which together form the sealing contact surface between the end-piece and the neck of the liner. In another example, a layer of a gas-tight material forms the sealed contact surface between the end-piece and the neck of the liner, for example, a layer of glue applied between the end-piece and the neck of the liner.

The invention can thus be implemented in several possible configurations as regards the tightness of the connection between the end-piece and the neck of the liner, which contributes to making the invention easy to adapt industrially.

Advantageously, the reinforcement ring comprises, on its outer radial surface:

- at least one through-hole, and/or
- at least one axial groove, which extends from an axial end of the reinforcement ring to an axial position in line with the annular seal, and/or
- at least one peripheral groove configured to place the axial grooves in fluid communication with one another.

These through-holes and grooves allow the gas contained in the tank to expand into a gap between the reinforcement ring and the neck of the liner. When the tank contains a pressurized gas, this makes it easier to establish a pressure equilibrium in this gap so as to apply pressure to the annular seal or to the sealing contact surface, thus improving the tightness of the tank.

Advantageously, the reinforcement ring comprises axial slots on its outer or inner radial surface.

This further improves the mechanical anchoring of the reinforcement ring in the neck of the liner.

Preferably, the reinforcement ring has, on the same surface as the one comprising the axial slots, a band of uniform radius separating the axial slots into two sets of axial slots separated by the band, and the annular seal bears sealingly against a bearing zone of the neck of the liner in contact with the band of the reinforcement ring being rigidly connected to and non-detachable from the neck of the liner.

Indeed, the annular seal exerts a permanent contact pressure on the neck of the liner in order to maintain the seal of the tank, and this contact pressure tends to cause the material of the neck of the liner in the bearing zone to creep. The presence of the band helps to even out the creep which the bearing zone of the neck of the liner undergoes when the tank is in service. This reduces the risk of leakage due to creep, and increases the service life of the tank.

The invention also relates to a process for manufacturing a tank for containing a pressurized gas, characterized in that it comprises the following steps:

- manufacturing a liner having the general shape of a cylinder with a main axis, the liner comprising a neck surrounding an axial opening of the liner and extending toward the outside of an internal volume of the tank,
- fastening a reinforcement ring for reinforcing the neck of the liner in the neck of the liner,
- inserting an end-piece at least partially into and around the neck of the liner, and
- fastening the end-piece to the reinforcement ring using fastening means located radially with respect to the neck of the liner, inside the neck of the liner, so that the reinforcement ring is positioned between the neck of the liner and the end-piece, and the neck of the liner is positioned between the reinforcement ring and the end-piece.

The invention also relates to a process for manufacturing a tank for containing a pressurized gas, characterized in that it comprises the following steps:

- manufacturing a liner having the general shape of a cylinder with a main axis, the liner comprising a neck surrounding an axial opening of the liner and extending toward the inside of an internal volume of the tank,
- fastening a reinforcement ring for reinforcing the neck of the liner around the neck of the liner,
- inserting an end-piece at least partially into the neck of the liner, and
- fastening the end-piece to the reinforcement ring using fastening means forming an axial extension of the neck of the liner, extending radially with respect to the neck of the liner, toward the internal volume of the tank, and inside the neck of the liner, so that the neck of the liner is positioned between the reinforcement ring and the end-piece.

According to one embodiment of the invention, the liner is made of plastic material and the step of fastening the reinforcement ring for reinforcing the neck of the liner to the neck of the liner is a step of overmolding the neck of the liner onto the reinforcement ring during the step of manufacturing the liner.

BRIEF DESCRIPTION OF THE FIGURES

The invention will be better understood from reading the following description, which is provided solely by way of example and with reference to the appended drawings, in which:

FIG. 1 is a section view of a tank for containing a pressurized gas according to a first embodiment of the invention, FIGS. 2A and 2B are cross sectional views of the tank of FIG. 1 in two alternative embodiments, FIG. 3 is a perspective view of a reinforcement ring comprised in the tank of FIG. 1, FIGS. 4A, 4B, and 4C are perspective views of reinforcement rings according to alternative embodiments of the invention, FIG. 5 is a section view of a tank for containing a pressurized gas according to a second embodiment of the invention, FIG. 10 is a section view of a tank for containing a pressurized gas according to a seventh embodiment of the invention, FIGS. 11A, 11B, and 11C are perspective views of reinforcement rings according to alternative embodiments of the invention.

FIG. 1 depicts a tank 2 for containing a pressurized gas according to a first embodiment of the invention. The tank 2 comprises a liner 4 made of plastic material defining an internal volume of the tank 2 for receiving the pressurized gas. The liner 4 herein has a central part having the general shape of a cylinder or a tube, with reference to a main axis 5 of the tank 2, and two end parts, one of which is depicted in FIG. 1. The end part of the liner 4 depicted comprises a neck 6 surrounding an axial opening of the liner placing the internal volume of the tank in communication with the outside environment, the neck 6 here extending toward the outside of the internal volume. The liner 4 is manufactured by injection molding, rotational molding or extrusion-blow molding of a thermoplastic or thermoset polymer material, such as polyamide or polyethylene, and the thickness of the liner is less than or equal to 5 mm.

Figure 6:
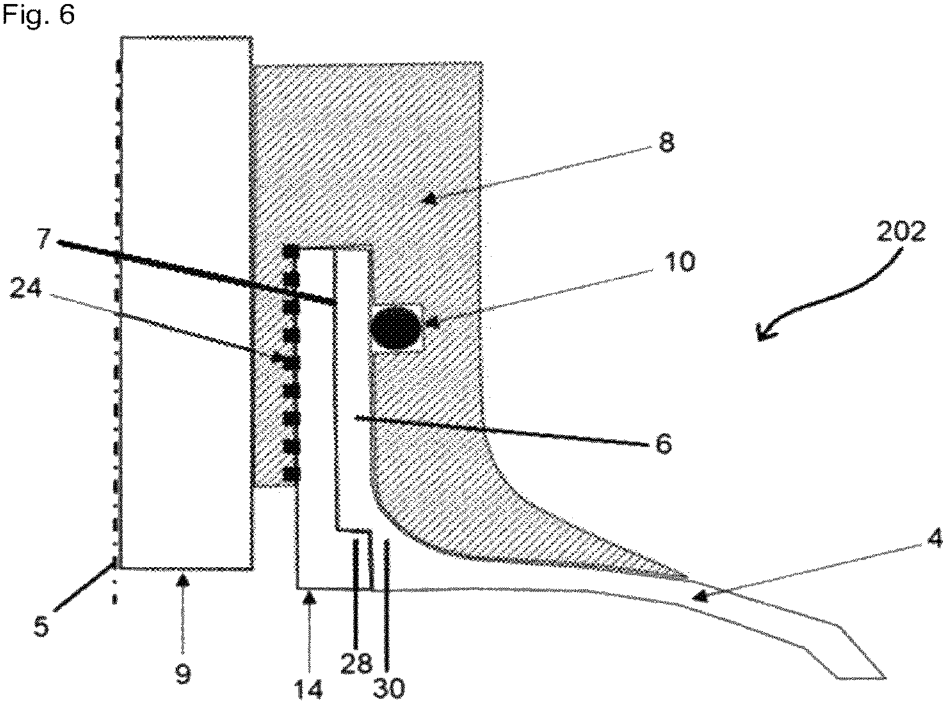
FIG. 6 is a section view of a tank for containing a pressurized gas according to a third embodiment of the invention.

The tank 2 comprises an end-piece 8 at least partially formed in and around the neck 6 of the liner 4. The end-piece 8 has a general shape that is rotationally symmetrical with respect to the main axis 5. The end-piece 8 comprises a central part extending partially inside the neck 6 of the liner 4 and a peripheral part extending partially around the neck 6 of the liner 4 so that the neck 6 of the liner 4 is protected from the outside environment by the end-piece 8. The end-piece 8 is made of metal, e.g. aluminum. The end-piece 8 is configured to receive an electrically operated valve 9 for alternately filling and emptying the gas from the tank 2.

The tank 2 comprises an annular seal 10 formed between the neck 6 of the liner 4 and the end-piece 8 and housed inside a cavity of the end-piece 8. The annular seal 10 bears sealingly against the neck 6 of the liner 4 and the end-piece 8 so as to make a sealed connection between the neck 6 of the liner 4 and the end-piece 8, so that the pressurized gas cannot escape from the tank 2 through a gap between the neck 6 of the liner 4 and the end-piece 8. The annular seal 10 is a radial seal surrounding the neck 6 of the liner 4. FIG. 2A depicts the configuration of the annular seal 10 in the tank 2 of FIG. 1. FIG. 2B depicts a configuration of the annular seal 10 according to one alternative embodiment of the invention. According to this variant, the cavity of the end-piece 8 housing the annular seal 10 comprises a removable ring 12. By removing the removable ring 12, the annular seal 10 can be easily removed or placed in the cavity of the end-piece 8, making it easier to mount the end-piece 8 on the neck 6 of the liner 4.

The tank 2 comprises a reinforcement ring 14 which serves to reinforce the neck 6 of the liner 4. The reinforcement ring 14 is rigidly connected to the neck 6 of the liner 4 and, in the configuration of FIG. 1, is formed inside the neck 6 of the liner 4 so that the neck 6 of the liner 4 surrounds and grips the reinforcement ring 14. A gap 7 may extend between the neck 6 of the liner 4 and the reinforcement ring 14. In the example shown, the neck 6 of the liner 4 is overmolded onto the reinforcement ring 14, so that the reinforcement ring 14 is overmolded inside the neck 6 of the liner 4 from the outside. The reinforcement ring 14 is made of a material having a breaking strain or a yield strength which is at least twice that of the material of which the liner 4 is made. For this purpose, the reinforcement ring 14 can be made of metal, such as aluminum or stainless steel, thermoplastic or thermoset material.

The reinforcement ring 14 is depicted in greater detail in FIG. 3. The reinforcement ring 14 extends in the axial direction over several millimeters, around 5 to 50 mm. The outer surface of this ring, i.e. the surface in contact with the neck 6 of the liner 4, has axial slots 16 distributed evenly around its entire periphery. Here, the axial slots 16 are dimensioned so that two axial slots are separated by a space equal to about twice the thickness of one axial slot. The axial slots 16 improve the rigid connection between the reinforcement ring 14 and the neck 6 of the liner 4, by virtue of form fitting.

The reinforcement ring 14 comprises, on its outer surface, i.e. the surface in contact with the neck 6 of the liner 4, radial protrusions 18 evenly distributed around its periphery and flush with an axial end of the reinforcement ring 14. The radial protrusions 18 improve the rigid connection of the reinforcement ring 14 to the neck 6 of the liner 4 by virtue of the radial protrusions 18 penetrating into the neck 6 of the liner 4. The radial protrusions 18 are shorter than the thickness of the liner 4 to avoid the risk of the radial protrusions 18 piercing the neck 6 of the liner 4. As the axial position of the radial protrusions 18 is not decisive, they may be located elsewhere than at the axial end of the reinforcement ring 14.

The reinforcement ring 14 comprises on its outer surface, i.e. on the same surface as that comprising the axial slots 16, a band 20 of uniform radius separating the axial slots 16 into two sets of axial slots separated by the band 20. The annular seal 10, depicted schematically, bears sealingly against a bearing zone of the neck 6 of the liner 4 in contact with the band 20 of the reinforcement ring 14 being rigidly connected to and non-detachable from the neck 6 of the liner 4, as shown in FIG. 1. The presence of the band 20 helps to even out the creep which the bearing zone of the neck 6 of the liner 4 undergoes when the tank 2 is in service.

FIG. 4 depicts reinforcement rings 14$a$, 14$b$, 14$c$ in different versions, the differences of which with the reinforcement ring 14 of FIG. 3 will be described.

The reinforcement ring 14$a$ in FIG. 4A lacks radial protrusions. Furthermore, the band 20 does not separate the axial slots in the sense that the axial slots 16 pass through the band 20.

The reinforcement ring 14$b$ in FIG. 4B lacks radial protrusions. Instead of these radial protrusions, the reinforcement ring 14$b$ features radial notches 18' evenly distributed around its outer surface. The radial notches 18' improve the rigid connection between the reinforcement ring 14 and the neck 6 of the liner 4, by virtue of the material of the liner 4 penetrating into the radial notches 18'. Furthermore, the band 20 does not separate the axial slots 16 in the sense that the axial slots 16 pass through the band 20.

The reinforcement ring 14$c$ in FIG. 4C lacks radial protrusions. Its outer surface features a denser set of axial slots 16. Here, the axial slots 16 are dimensioned so that two axial slots are separated by a gap less than or equal to the thickness of one axial slot. Some of the axial slots 16 extend onto an axial surface of the reinforcement ring 14.

The tank 2 comprises fastening means 24 for fastening the end-piece 8 to the reinforcement ring 14, configured to mechanically anchor the end-piece 8 to the reinforcement ring 14. This is a mechanical screw anchor, but in one alternative embodiment it is a mechanical snap anchor. An axial zone of length A is defined, in which the entire fastening means 24 and the neck 6 of the liner 4 extend. The length A corresponds to the increase in the axial dimensions of the container caused by the neck 6 of the liner 4 and the fastening means 24 in the configuration in which the neck 6 extends toward the outside of the internal volume of the container 2. The length A characterizes the ratio between the useful volume of the tank 2, i.e. its internal volume, and the overall dimensions of the tank 2, especially linked to the total volume of the tank 2. Reducing the length A reduces the increase in the overall dimensions of the tank. It can be seen from FIG. 1 that, according to the invention, the neck 6 of the liner 4 and the fastening means 24 extend radially with respect to each other. In this way, the length A is not equal to the sum of the lengths along the main axis 5 of the neck 6 of the liner 4 and the fastening means 24, but is equal to the maximum of the lengths along the main axis 5 of the neck 6 of the liner 4 and the fastening means 24. When these two lengths are equal or substantially equal, as is the case in the present embodiment, the ratio between the mechanical strength of the fastening provided by the fastening means 24 and the overall dimensions of the tank 2 is optimized. The value of the length A is preferably less than 30 mm, more preferably less than 20 mm, even more preferably less than 10 mm.

The tank 2 is manufactured by a manufacturing process comprising the following steps. First, the liner 4 is manufactured by injection-molding two shells forming two halves of the liner, which are then welded together. The reinforcement ring 14 is fastened in the neck 6 of the liner 4, for example by overmolding the neck 6 of the liner 4 onto the reinforcement ring 14 during the manufacturing of the liner 4. The end-piece 8 is then inserted at least partially into and around the neck 6 of the liner 4. Finally, the end-piece 8 is fastened to the reinforcement ring 14 using fastening means 24 inside the neck 6 of the liner 4, so that the reinforcement ring 14 is positioned between the neck 6 of the liner 4 and the end-piece 8, and the neck 6 of the liner 4 is positioned between the reinforcement ring 14 and the end-piece 8. In particular, the end-piece 8 is in direct contact with the reinforcement ring 14 and the neck 6 of the liner 4.

Tanks for containing a pressurized gas will now be described according to other embodiments of the invention. In what follows, only what differentiates the tanks according to these embodiments from the tank 2 according to the first embodiment of the invention will be described. The elements of these tanks similar to those of the tank 2 according to the first embodiment of the invention bear identical numerical references.

FIG. 5 depicts a tank 102 for containing a pressurized gas according to a second embodiment of the invention. The tank 102 differs from the tank of the first embodiment in that the reinforcement ring 14 comprises a shoulder 26 for cooperating with the end-piece 8 configured to receive one axial end of the end-piece 8. The shoulder 26 for cooperating with the end-piece 8 thus forms an axial abutment to facilitate correct positioning of the end-piece 8 with respect to the reinforcement ring 14. For example, when the fastening means 24 form a screw-fastening, the shoulder 26 for cooperating with the end-piece 8 forms a screw-fastening abutment for the end-piece 8 with respect to the reinforcement ring 14.

FIG. 6 depicts a tank 202 for containing a pressurized gas according to a third embodiment of the invention. The tank 202 differs from the tank of the first embodiment in that the reinforcement ring 14 comprises a shoulder 28 for cooperating with the liner 4 configured to receive a complementary shoulder 30 formed on the liner 4, at the base of the neck 6. The shoulder 28 for cooperating with the liner 4 thus forms an axial abutment to facilitate correct positioning of the neck 6 of the liner 4, and more generally of the liner 4, with respect to the reinforcement ring 14. In one advantageous embodiment, the shoulder 28 includes the radial protrusions or radial notches as described hereinbefore.

Figure 7:
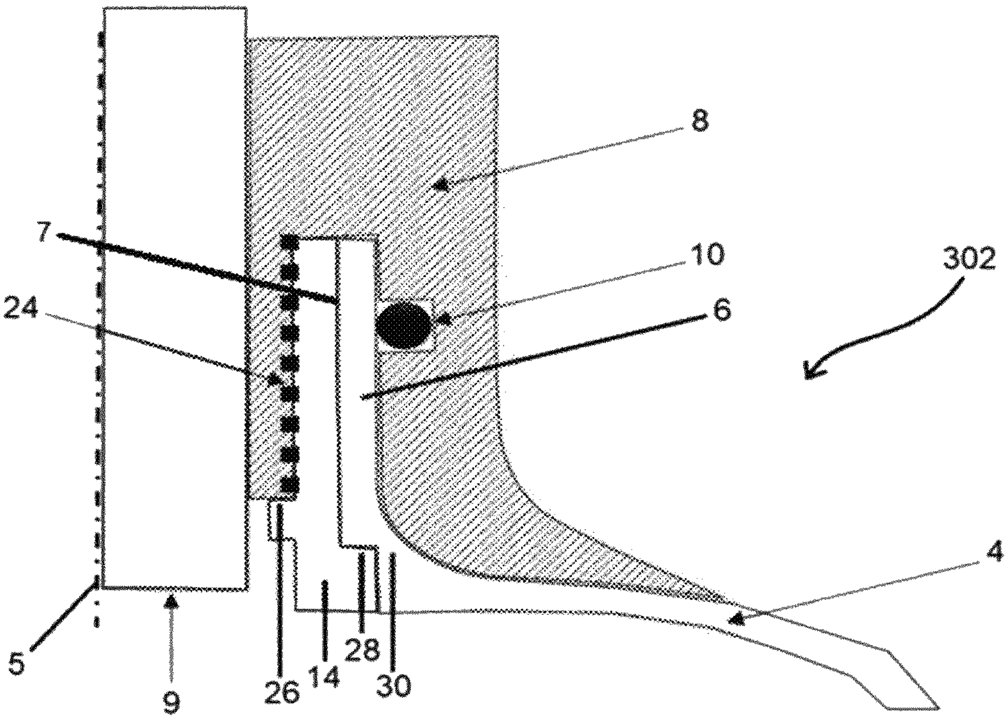
FIG. 7 is a section view of a tank for containing a pressurized gas according to a fourth embodiment of the invention.

FIG. 7 depicts a tank 302 for containing a pressurized gas according to a fourth embodiment of the invention. The tank 302 differs from the tank of the first embodiment in that it combines the second and third embodiments of the invention. The reinforcement ring 14 comprises a shoulder 26 for cooperating with the end-piece 8 configured to receive an axial end of the end-piece 8, as well as a shoulder 28 for cooperating with the liner 4 configured to receive a complementary shoulder 30 formed on the liner 4, at the base of the neck 6. The operation of the shoulder 26 for cooperating with the end-piece 8 and the shoulder 28 for cooperating with the liner 4 are as described in the second and third embodiments of the invention.

Figure 8:
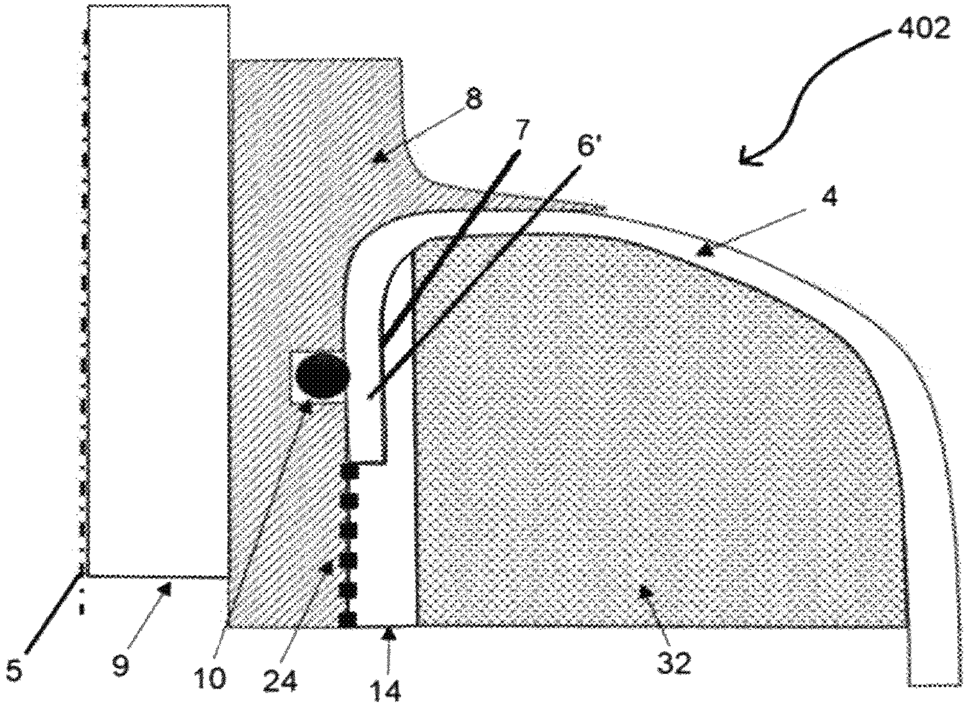
FIG. 8 is a section view of a tank for containing a pressurized gas according to a fifth embodiment of the invention.

FIG. 8 depicts a tank 402 for containing a pressurized gas according to a fifth embodiment of the invention. The tank 402 differs from the tank of the first embodiment in that the neck 6' of the liner 4 extends toward the inside of the internal volume of the tank 2, and in that the reinforcement ring 14 being rigidly connected to and non-detachable from the neck 6' of the liner 4 is at least partially formed around the neck 6' of the liner 4. In the example shown, the neck 6' of the liner 4 is overmolded onto the reinforcement ring 14, so that the reinforcement ring 14 is overmolded around the neck 6' of the liner 4 from the inside. The annular seal 10 is a radial seal which, in this case, is surrounded by the neck 6' of the liner 4. The configuration of the neck 6' of the liner 4 extending toward the inside of the internal volume of the tank 402 generates the presence of a dead volume 32 in the internal volume as described in the preamble to the present application. The fastening means 24 form an axial extension of the neck 6' of the liner 4 toward the internal volume of the tank, so that the neck 6' of the liner 4 is positioned between the reinforcement ring 14 and the end-piece 8. The reinforcement ring 14 is located at least partially around the neck 6' of the liner 4, and the inner surface thereof, i.e. the surface in contact with the neck 6' of the liner 4, may feature axial slots, a band, radial protrusions and/or radial notches as presented in the first embodiment and in FIGS. 3, 4A, 4B, and 4C.

The tank 402 is manufactured by a manufacturing process comprising the following steps. First, the liner 4 is manufactured by injection-molding two shells forming two halves of the liner, which are then welded together. The reinforcement ring 14 is fastened around the neck 6' of the liner 4, for example by overmolding the neck 6' of the liner 4 onto the reinforcement ring 14 during the manufacturing of the liner 4. The end-piece 8 is then inserted at least partially into the neck 6' of the liner 4. Finally, the end-piece 8 is fastened to the reinforcement ring 14 using fastening means 24 forming an axial extension of the neck 6' of the liner 4 toward the internal volume of the tank 402, so that the neck 6' of the liner 4 is positioned between the reinforcement ring 14 and the end-piece 8.

Figure 9:
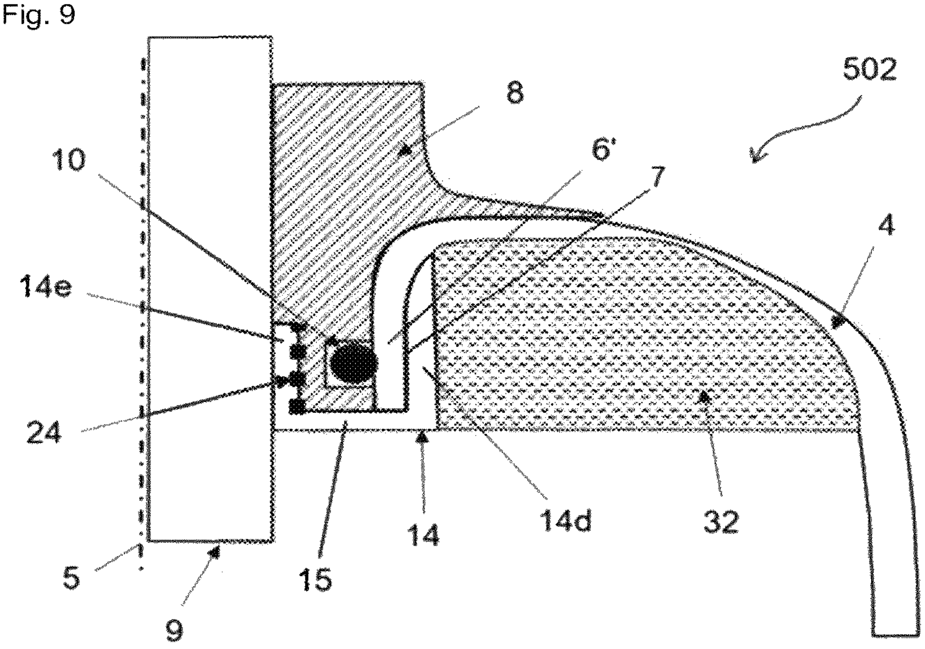
FIG. 9 is a section view of a tank for containing a pressurized gas according to a sixth embodiment of the invention.

FIG. 9 depicts a tank 502 for containing a pressurized gas according to a sixth embodiment of the invention. The tank 502 differs from the tank of the first embodiment in that the neck 6' of the liner 4 extends toward the inside of the internal volume of the tank 2 and in that the reinforcement ring 14 being rigidly connected to and non-detachable from the neck 6' of the liner 4 is at least partially formed around the neck 6' of the liner 4. In the example shown, the neck 6' of the liner 4 is overmolded onto the reinforcement ring 14, so that the reinforcement ring 14 is overmolded around the neck 6' of the liner 4 from the inside. The configuration of the neck 6' of the liner 4 extending toward the inside of the internal volume of the tank 402 generates the presence of a dead volume 32 in the internal volume as described in the preamble to the present application. The fastening means 24 are located radially with respect to the neck 6' of the liner 4 inside the neck 6' of the liner 4, so that the neck 6' of the liner 4 is positioned between the reinforcement ring 14 and the end-piece 8. The reinforcement ring 14 is located at least partially around the neck 6' of the liner 4, and the inner surface thereof, i.e. the surface in contact with the neck 6' of the liner 4, may feature axial slots, a band, radial protrusions and/or radial notches as presented in the first embodiment and in FIGS. 3, 4A, 4B, and 4C.

In the illustrated example, the reinforcement ring 14 is in fact a double reinforcement ring **14*d*, 14*e* in which a first reinforcement ring 14*d* is formed outside the neck 6' of the liner 4 so that the first reinforcement ring 14*d* surrounds and grips the neck 6' of the liner 4 and a second reinforcement ring 14*e* carries the fastening means 24. The first reinforcement ring 14*d* is coaxial with the second reinforcement ring 14*e* and its inner radius is greater than the outer radius of the second reinforcement ring 14*e*, so that an annular gap is formed between the first reinforcement ring 14*d* and the second reinforcement ring 14*e*. The first reinforcement ring 14*d* is connected to the second reinforcement ring 14*e* by a washer-shaped reinforcement core 15. The reinforcement core 15 has an outer radius matching the outer radius of the first reinforcement ring 14*d* and an inner radius matching the inner radius of the second reinforcement ring 14*e*. The annular space formed between the first reinforcement ring 14*d* and the second reinforcement ring 14*e* is designed to receive the neck 6' of the liner 4 and an axial end of the end-piece 8, so that the neck 6' of the liner 4 is protected from the outside environment by the end-piece 8**.

The tank 502 is manufactured by a manufacturing process comprising the following steps. First, the liner 4 is manufactured by injection-molding two shells forming two halves of the liner, which are then welded together. The reinforcement ring 14 is fastened around the neck 6' of the liner 4, for example by overmolding the neck 6' of the liner 4 onto the reinforcement ring 14 during the manufacturing of the liner 4. The end-piece 8 is then inserted at least partially into the neck 6' of the liner 4. Finally, the end-piece 8 is fastened to the reinforcement ring 14 using fastening means 24 located radially with respect to the neck 6' of the liner 4 inside the neck 6' of the liner 4, so that the neck 6' of the liner 4 is positioned between the reinforcement ring 14 and the end-piece 8.

FIG. 10 depicts a tank 602 for containing a pressurized gas according to a seventh embodiment of the invention. The tank 602 differs from the tank of the first embodiment in that it comprises a sealed contact surface 10' between the end-piece 8 and the neck 6 of the liner 4, so that the pressurized gas cannot escape from the tank 2 through a gap between the neck 6 of the liner 4 and the end-piece 8. In the example shown, a layer of gas-tight material forms the sealing contact surface 10' between the end-piece 8 and the neck 6 of the liner 4, for example, a layer of adhesive applied between the end-piece 8 and the neck 6 of the liner 4. In another embodiment of the invention (not shown), the neck 6 of the liner 4 and the end-piece 8 each have a smooth surface which together form the sealed contact surface 10' between the end-piece 8 and the neck 6 of the liner 4.

FIG. 11 depicts reinforcement rings **14*d*, 14*e*, 14*f* in different versions, the differences of which with the reinforcement ring 14 of FIG. 3** will be described.

The reinforcement ring **14*d* in FIG. 11A has through-holes 34 evenly distributed around the circumference of the reinforcement ring 14*d*. The holes 34 have a diameter of less than 3 mm, preferably less than 2 mm, more preferably less than 1 mm. These holes 34 allow the pressurized gas contained in the tank to propagate into the gap 7 and thus facilitate the establishment of a pressure equilibrium in this gap 7** with respect to the internal volume of the tank, so as to apply pressure to the annular seal or to the sealed contact surface. This improves the seal of the tank, at low cost.

The reinforcement ring **14*e* in FIG. 11B has axial grooves 36 on its outer surface, evenly distributed around the circumference of the reinforcement ring 14*e*. The axial grooves 36 all extend from one axial end of the reinforcement ring 14*e* to the other axial end of the reinforcement ring 14*e*. In another embodiment of the invention (not shown), the axial grooves 36 each extend from an axial end of the reinforcement ring 14*e* to an axial position in line with the annular seal 10, i.e. the axial grooves 36 only open out at one axial end of the reinforcement ring 14*e*. The axial grooves 36 have a width of less than 1 mm, preferably less than 0.5 mm, more preferably less than 0.3 mm. The axial grooves 36 have the same function as the holes 34 of the reinforcement ring 14*d* of FIG. 11A, in that the axial grooves 36 allow the pressurized gas contained in the tank to propagate into the gap 7** and thus facilitate the establishment of a pressure equilibrium in this gap with respect to the internal volume of the tank, so as to apply pressure to the annular seal or to the sealing contact surface. This improves the seal of the tank.

The reinforcement ring **14*f* in FIG. 11C has, on its outer surface, axial grooves 36 evenly distributed around the circumference of the reinforcement ring 14*e*, which all extend from one axial end of the reinforcement ring 14*e* to the other axial end of the reinforcement ring 14*e*, in a similar manner to the grooves of the reinforcement ring 14*e* in FIG. 11B. The reinforcement ring 14*f* also has a peripheral groove 36' on its outer surface, extending radially around the entire circumference of the reinforcement ring. The peripheral groove 36' herein has a width of less than 1 mm, preferably less than 0.5 mm, more preferably less than 0.3 mm. The peripheral groove 36' especially promotes uniform pressure in the gap 7 by placing the axial grooves 36** in fluid communication with one another.

According to one alternative embodiment of the invention, the reinforcement ring can comprise both through-holes and grooves as defined hereinbefore.

Figure 12:
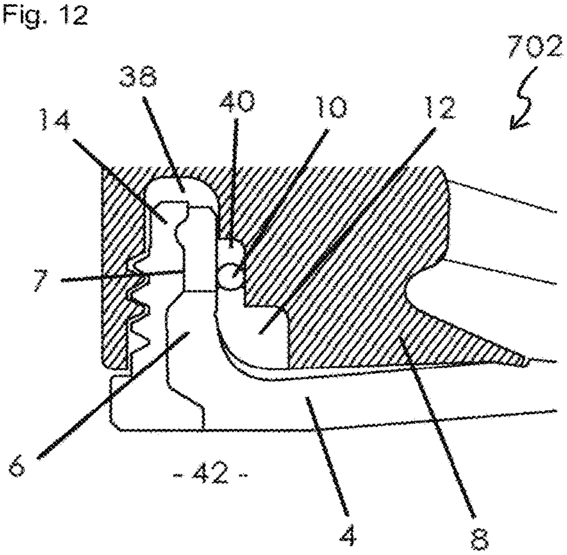
FIG. 12 is a section view of a tank for containing a pressurized gas according to an eighth embodiment of the invention.

FIG. 12 depicts a tank 702 for containing a pressurized gas according to an eighth embodiment of the invention. The tank 702 differs from the tank of the first embodiment in that it has a first cavity 38 extending between the end-piece 8 and the axial ends of the reinforcement ring 14 and the neck 6 of the liner 4, and in that it has a second cavity 40, formed in the end-piece 8 matching the cavity of the end-piece shown in relation to FIG. 1, into which the annular seal 10 extends.

When filling or emptying the tank 702, the first and second cavities 38, 40 can exhibit a pressure difference with an internal volume 42 of the tank. This is especially critical when the tank 702 is emptied, since the pressure inside the first and second cavities 38, 40 can remain higher than the pressure inside the internal volume 42 even after emptying is complete. This pressure increases the risk of pressurized gas leaking from the tank 702. This is particularly noticeable when the pressure in the internal volume drops below 50 bar and at low temperatures, and is amplified when the tank 702 is emptied at high flow rates. To overcome these problems, the tank 702 includes means configured to place the first and second cavities 38, 40 in fluid communication with the internal volume 42. These means are referred to as first communication means 44 and second communication means 45 hereinafter. The first communication means 44 is located upstream of the first cavity 38, while the second communication means 45 is located downstream of the first cavity 38. The terms upstream and downstream are used in the direction of flow of the pressurized gases exiting the tank.

Figure 13:
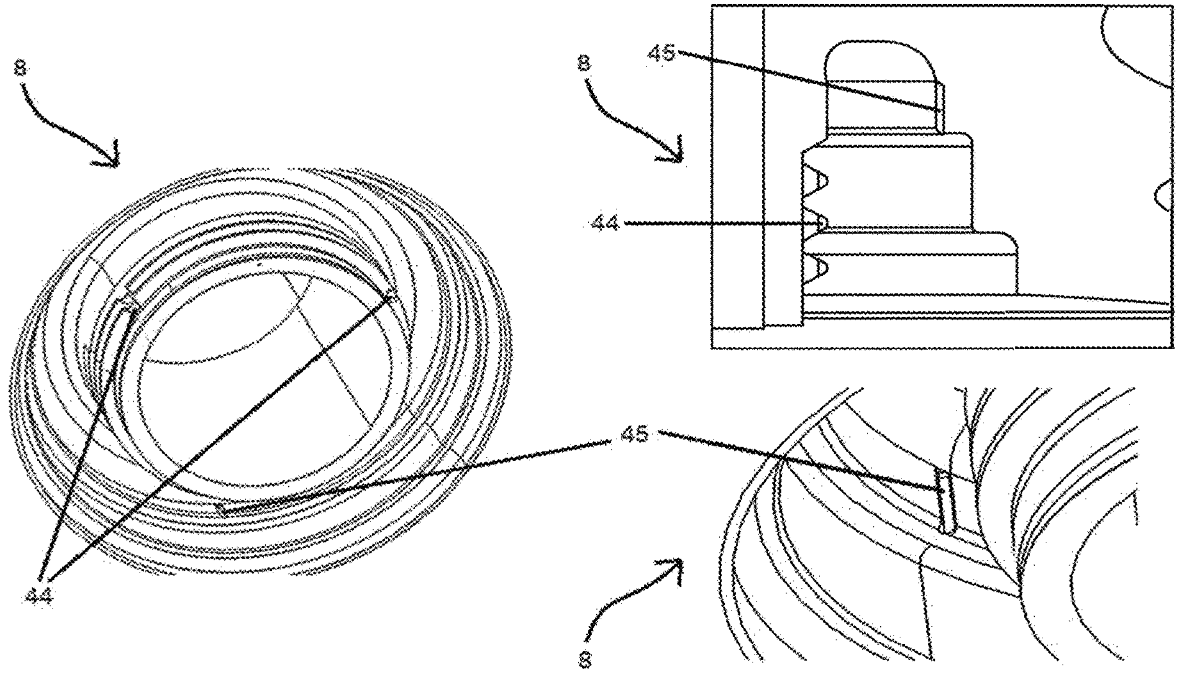
FIG. 13 is a section view of communication means of the tank of FIG. 12, according to a first embodiment of these means.

FIG. 13 depicts a first embodiment of the communication means 44 and 45, in which these means are made up of open channels formed in the end-piece 8.

Figure 14:
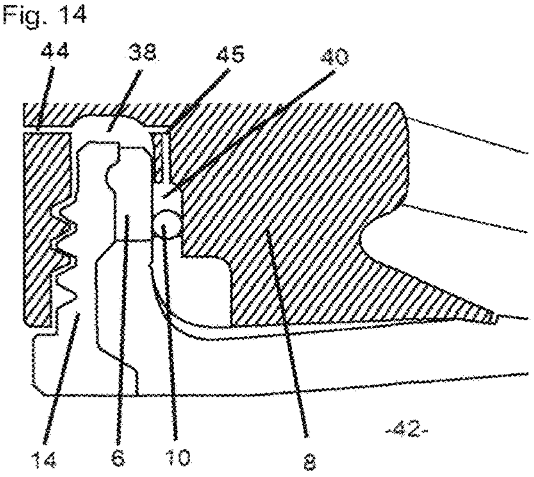
FIG. 14 is a section view of communication means of the tank of FIG. 12, according to a second embodiment of these means.

FIG. 14 depicts a second embodiment of the communication means 44 and 45, in which these means are made up of channels drilled in the end-piece 8, in two alternative configurations.

Figure 15:
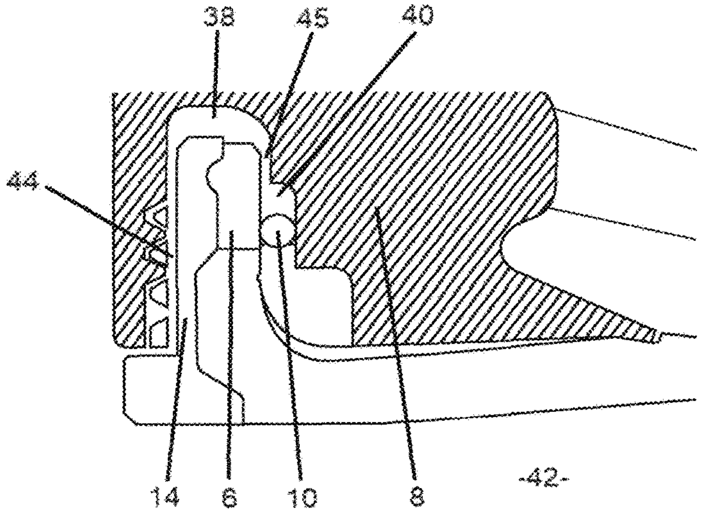
FIG. 15 is a section view of communication means of the tank of FIG. 12, according to a third embodiment of these means.

FIG. 15 depicts a third embodiment of the communication means 44 and 45, in which these means are made up of open channels formed in the neck 6 of the liner 4 and in the reinforcement ring 14.

In a fourth embodiment (not shown), at least one channel is made in the neck 6 of the liner 4 in order to place the volume 40 in fluid communication with the internal volume 42 of the tank.

Figure 16:
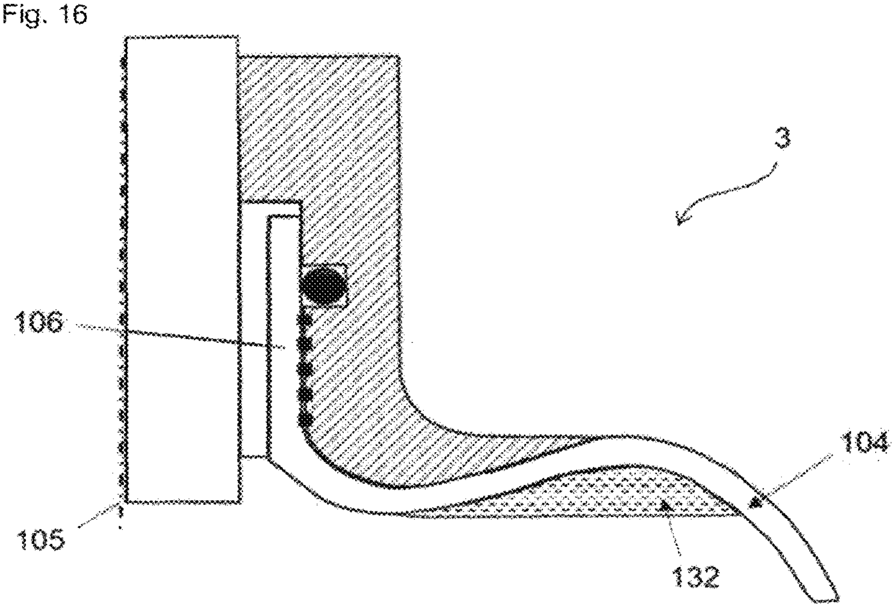
FIG. 16 is a section view of a tank for containing a pressurized gas according to the state of the art.

FIG. 16 depicts a tank 3 for containing a pressurized gas according to the state of the art. The tank 3 comprises a liner 104 made of plastic material defining an internal volume of the tank 3 for receiving the pressurized gas. The liner 104 herein has a central part having the general shape of a cylinder or a tube, with reference to a main axis 105 of the tank 3, and two end parts, one of which is depicted in FIG. 11. The end part of the liner 104 depicted comprises a neck 106 surrounding an axial opening of the liner placing the internal volume of the tank in communication with the outside environment. Herein, the neck 106 extends toward the outside of the internal volume of the tank 3 and is axially offset inward toward the internal volume of the tank 3. The configuration of the neck 106 of the liner 3 axially offset toward the inside of the internal volume of the tank 3 generates the presence of a dead volume 132 in the internal volume as described in the preamble to the present application.

The invention is not limited to the embodiments presented, and other embodiments will become clearly apparent to those skilled in the art. In particular, the embodiments of the invention relating to a tank in which the neck of the liner is oriented toward the inside of the internal volume of the tank are also applicable to a tank in which the neck of the liner is oriented toward the outside of the internal volume of the tank. Conversely, the embodiments of the invention relating to a tank in which the neck of the liner is oriented toward the outside of the internal volume of the tank are also applicable to a tank in which the neck of the liner is oriented toward the inside of the internal volume of the tank. In general, it is possible to combine the various embodiments, especially with regard to the configuration of the neck of the liner, the removable ring, the reinforcement ring and the presence of the cooperating shoulders.

LIST OF REFERENCES

- 2; 3; 102; 202; 302; 402; 502; 602; 702: tank for containing a pressurized gas
- 4; 104: liner
- 5; 105: main axis
- 6; 6'; 106: neck
- 7: gap
- 8: end-piece
- 9: electrically operated valve
- 10: annular seal
- 10': sealed contact surface between the end-piece and the neck
- 12: removable ring
- 14, **14*a*, 14*b*, 14*c*, 14*d*, 14*e*, 14*f***: reinforcement ring
- 15: reinforcement core
- 16: axial slot
- 18: radial protrusion
- 18': radial notch
- 20: band
- 24: fastening means
- 26: shoulder for cooperating with the end-piece
- 28: shoulder for cooperating with the liner
- 30: additional shoulder
- 32; 132: dead volume
- 34: through-hole
- 36: axial groove
- 36': peripheral groove
- 38: first cavity
- 40: second cavity
- 42: internal volume of the tank
- 44: first communication means
- 45: second communication means

The invention claimed is:

1. A tank for containing a pressurized gas comprising a liner made of plastic material having the general shape of a cylinder with a main axis, the liner comprising a neck surrounding an axial opening of the liner, wherein the liner comprises: an end-piece at least partially formed in and around the neck of the liner, a reinforcement ring for reinforcing the neck of the liner and being rigidly connected to and non-detachable from the neck of the liner, and fastening means for fastening the end-piece to the reinforcement ring for reinforcing the neck of the liner, so that the end-piece is in direct contact with the reinforcement ring and the neck of the liner, the end-piece comprising an annular seal bearing sealingly against the neck of the liner, the annular seal being housed in a cavity of the end-piece.

2. The tank according to claim 1, wherein the neck of the liner extends toward the outside of an internal volume of the tank, and the reinforcement ring is at least partially formed in the neck of the liner, and the fastening means are located radially with respect to the neck of the liner, inside the neck of the liner, so that the reinforcement ring is positioned between the neck of the liner and the end-piece, and the neck of the liner is positioned between the reinforcement ring and the end-piece.

3. The tank according to claim 1, wherein the neck of the liner is overmolded onto the reinforcement ring.

4. The tank according to claim 1, wherein the reinforcement ring is made of a material having a breaking strain or a yield strength which is at least twice that of the material of which the liner is made.

5. The tank according to claim 4, wherein the reinforcement ring is made of metal, thermoplastic material, or thermosetting material.

6. The tank according to claim 1, wherein the fastening means are configured to mechanically anchor the end-piece to the reinforcement ring by screwing or snap-fastening.

7. The tank according to claim 1, wherein the reinforcement ring comprises a shoulder for cooperating with the end-piece configured to receive an axial end of the end-piece.

8. The tank according to claim 1, wherein the reinforcement ring comprises a shoulder for cooperating with the liner configured to receive a complementary shoulder formed on the liner, at the base of the neck.

9. The tank according to claim 1, wherein the cavity of the end-piece is closed by a ring in order to form a groove for housing the annular seal, the ring is a removable ring.

10. The tank according to claim 1, wherein the annular seal is a radial seal surrounding the neck of the liner or surrounded by the neck of the liner.

11. The tank according to claim 1, further comprising a first communication means configured to place an internal volume of the tank in fluid communication with a first cavity extending between the end-piece and the axial ends of the reinforcement ring and the neck of the liner.

12. The tank according to claim 11, further comprising a second communication means configured to place the first cavity in fluid communication with a second cavity, or cavity of the end-piece, into which the annular seal extends.

13. The tank according to claim 1, further comprising a sealed contact surface between the end-piece and the neck of the liner.

14. The tank according to claim 1, wherein the reinforcement ring comprises, on its outer radial surface:

- at least one through-hole (34), and/or
- at least one axial groove, which extends from an axial end of the reinforcement ring to an axial position in line with the annular seal, and/or
- at least one peripheral groove configured to place the axial grooves in fluid communication with one another.

15. The tank according to claim 1, wherein the reinforcement ring comprises axial slots on its outer or inner radial surface.

16. The tank according to claim 15, wherein the reinforcement ring has, on the same surface as the one comprising the axial slots, a band of uniform radius separating the axial slots into two sets of axial slots separated by the band, and the annular seal bears sealingly against a bearing zone of the neck of the liner in contact with the band of the reinforcement ring being rigidly connected to and non-detachable from the neck of the liner.

17. A tank for containing a pressurized gas comprising a liner made of plastic material having the general shape of a cylinder with a main axis, the liner comprising a neck surrounding an axial opening of the liner and extending toward the inside of an internal volume of the tank, wherein the liner comprises:

an end-piece at least partially formed in the neck of the liner, a reinforcement ring for reinforcing the neck of the liner and being rigidly connected to and non-detachable from the neck of the liner, and fastening means for fastening the end-piece to the reinforcement ring for reinforcing the neck of the liner.

18. The tank according to claim 17, wherein the reinforcement ring is at least partially formed around the neck of the liner, and the fastening means form an axial extension of the neck of the liner, extend radially with respect to the neck of the liner, toward the internal volume of the tank, and inside the neck of the liner, so that the neck of the liner is positioned between the reinforcement ring and the end-piece.

19. A process for manufacturing a tank for containing a pressurized gas, comprising:

manufacturing a liner having the general shape of a cylinder with a main axis, the liner comprising a neck surrounding an axial opening of the liner and extending toward the outside of an internal volume of the tank, fastening a reinforcement ring for reinforcing the neck of the liner in the neck of the liner, inserting an end-piece at least partially into and around the neck of the liner, and fastening the end-piece to the reinforcement ring using fastening means located radially with respect to the neck of the liner, inside the neck of the liner, so that the reinforcement ring is positioned between the neck of the liner and the end-piece, and the neck of the liner is positioned between the reinforcement ring and the end-piece.

20. The process according to claim 19, wherein the liner is made of plastic material and the step of fastening the reinforcement ring for reinforcing the neck of the liner to the neck of the liner is a step of overmolding the neck of the liner onto the reinforcement ring during the step of manufacturing the liner.

21. A process for manufacturing a tank for containing a pressurized gas, comprising:

manufacturing a liner having the general shape of a cylinder with a main axis, the liner comprising a neck surrounding an axial opening of the liner and extending toward the inside of an internal volume of the tank, fastening a reinforcement ring for reinforcing the neck of the liner around the neck of the liner, inserting an end-piece at least partially into the neck of the liner, and fastening the end-piece to the reinforcement ring using fastening means forming an axial extension of the neck of the liner, extending radially with respect to the neck of the liner, toward the internal volume of the tank, and inside the neck of the liner, so that the neck of the liner is positioned between the reinforcement ring and the end-piece.

* * * * *